US006629243B1

(12) United States Patent
Kleinman et al.

(10) Patent No.: US 6,629,243 B1
(45) Date of Patent: Sep. 30, 2003

(54) SECURE COMMUNICATIONS SYSTEM

(75) Inventors: Amit Kleinman, Jerusalem (IL); Shlomo Kipnis, Jerusalem (IL)

(73) Assignee: NDS Limited, Middlesex (GB)

( * ) Notice: Subject to any disclaimer, the term of this patent is extended or adjusted under 35 U.S.C. 154(b) by 0 days.

(21) Appl. No.: 09/414,061

(22) Filed: Oct. 7, 1999

(30) Foreign Application Priority Data

Oct. 7, 1998 (IL) ................................................. 126472

(51) Int. Cl.[7] ............................................... A04L 9/08

(52) U.S. Cl. ........................ 713/163; 713/171; 380/278

(58) Field of Search ................................ 713/163, 171

(56) References Cited

U.S. PATENT DOCUMENTS

| | | | | | |
|---|---|---|---|---|---|
| 4,611,272 | A | * | 9/1986 | Lomet ............................ | 707/3 |
| 5,210,794 | A | * | 5/1993 | Brunsgard .................... | 380/257 |
| 5,282,249 | A | | 1/1994 | Cohen et al. .................. | 380/23 |
| 5,481,609 | A | | 1/1996 | Cohen et al. .................. | 380/16 |
| 5,644,768 | A | | 7/1997 | Periwal et al. ............... | 395/672 |
| 5,708,709 | A | | 1/1998 | Rose ............................. | 380/4 |
| 5,720,036 | A | | 2/1998 | Garfinkle et al. ......... | 395/200.6 |
| 5,748,736 | A | | 5/1998 | Mittra .......................... | 380/21 |
| 5,761,500 | A | | 6/1998 | Gallant et al. .............. | 395/610 |

FOREIGN PATENT DOCUMENTS

| | | | | |
|---|---|---|---|---|
| EP | 0887982 A2 | 6/1998 | ........... | H04L/29/06 |

OTHER PUBLICATIONS

D. Maughan et al., "Internet Security Association and Key Management Protocol," Materials Collected From the World Wide Web, http://www.ietf.org/internet–drafts/draft–ietf–ipsec–isakmp–09.txt, Mar. 10, 1998, pp. 1–73.

A. Aziz et al., "Simple Key–Management for Internet Protocols (SKIP)," Internet Memorandum, Jan. 27, 1998, pp. 1–20.

R. Canetti et al., "A Taxonomy of Multicast Security Issues," IBM Research and the Weizmann Institute, Internet Memorandum, May 1998, pp. 1–12.

H. Orman, "The Oakley Key Determination Protocol," University of Arizona, Dept. of Computer Science, Internet Memorandum, Sep. 10, 1997, http://ftp.ietf.org/internet-drafts/draft–ietf–ipsec–oakley–02.txt, pp. 1–41.

P. Karn et al., "Photuris: Session–Key Management Protocol," Internet Memorandum, Nov. 1997, http://www.phys-net.uni–hamburg.de/provos/photuris/draft–simpson–photuris–current.txt, pp. 1–61.

T. Hardjono et al., "A Framework for Group Key Management for Multicast Security," Bay Networks, Internet Memorandum, Jul. 1998, http://www.ietf.org/internetdrafts/draft–ietf–ipsec–gkmframework–00.txt, pp. 1–19.

M. Handley et al., "SDP: Session Description Protocol," Network Working Group Memorandum, Apr. 1998, pp. 1–42.

A. Aziz et al., "Skip Extensions for IP Multicast," Internet Memorandum, Feb. 23, 1998, http:/www.skip.org/spec/eipm.html, pp. 1–5.

(List continued on next page.)

*Primary Examiner*—Gilberto Barrón
*Assistant Examiner*—G. Gurshman
(74) *Attorney, Agent, or Firm*—Ladas & Parry

(57) ABSTRACT

A key distribution method for distributing, via a communications network, a key in a multicast communications system in which each one of a plurality of communications is directed to an associated multicast group including a plurality of recipients intended to receive the one communication. The method includes providing a plurality of implemented key distribution methods, dynamically choosing one implemented key distribution method of the plurality of key distribution methods, and distributing at least one key using the one implemented key distribution method.

Related apparatus and methods are also provided.

19 Claims, 3 Drawing Sheets

OTHER PUBLICATIONS

H. Harney et al., "Group Key Management Protocol (GKMP) Specification," Sparta, Inc. Internet Memorandum, Jul. 1997, http://andrew2.andrew.cmu.edu/rfc/rfc2093.html, pp. 1–20.

H. Harney et al., "Group Key Management Protocol (GKMP) Architecture," Sparta, Inc. Internet Memorandum, Jul. 1997, http://andrew2.andrew.cmu.edu/rfc/rfc2094.html, pp. 1–18.

A. Ballardie, "Scalable Multicast Key Distribution," University College, London, Internet Memorandum, Jun. 20, 1995, pp. 1–16.

D. Harkins et al., "The Internet Key Exchange (IKE)," Cisco Systems, Internet Memorandum, Nov. 1998, http://www.i-etf.org/rfc/rfc2409.txt, pp. 1–34.

S. Mittra, "IOLUS: A Framework for Scalable Secure Multicasting," Proceedings of ACM SIGCOMM '97, Sep. 1997, pp. 1–12.

H. Krawczyk, "SKEME: A Versatile Secure Key Exchange Mechanism for Internet," IEEE Proceedings of the 1996 Symposium on Network and Distributed Systems Security, Feb. 1996, pp. 114–127.

\* cited by examiner

SECURE COMMUNICATIONS SYSTEM

FIELD OF THE INVENTION

The present invention relates to multicast communications systems in general, and in particular to key distribution mechanisms suitable for use in multicast communications systems.

BACKGROUND OF THE INVENTION

Multicast communications systems, particularly Internet Protocol (IP) multicast communication systems, are well-known in the art. As is well-known in the art, in an IP multicast message, a single address is used by the sender to indicate a multicast comprising plurality of recipients, possibly including recipients at many different locations.

Multicast is an internetwork service that provides efficient delivery of data from a source to multiple recipients. It reduces sender transmission overhead, network bandwidth requirements, and the latency observed by receivers. IP Multicast enables efficient, many-to-many datagram distribution over an IP network.

Multicast is more susceptible to attacks than unicast for many reasons. Multicast presents many more opportunities for interception of traffic. When an attack on a multicast service does take place, a larger number of principals is affected. It is easier for an attacker to target an attack, as multicast services are generally well advertised and their addresses are well-known. Lastly, multicast services typically involve a "crowd" of principals, making it potentially easier for an attacker to pose as another (legitimate) principal or to try to attack in parallel at several locations.

The following references discuss multicast technology and related security issues known in the art:

R. Canetti, B. Pinkas, "A taxonomy of multicast security issues", draft-canetti-secure-multicast-taxonomy-00.txt, May 1998.

D. Harkins and D. Carrel, "The Internet Key Exchange (IKE)", draft-ietf-ipsec-isakmp-oakley07.txt, March 1998.

A. Aziz, T. Markson, and H. Prafullchandra, "Simple Key-Management for Internet Protocols (SKIP)".

D. Maughan, M. Schertler, M. Schneider, and J. Turner, "Internet Security Association and Key Management Protocol (ISAKMP)", draft-ietf-ipsec-isakmp-09.txt, March 1998.

H. Orman, "The OAKLEY Key Determination Protocol", draft-ietf-ipsec-oakley-02.txt, July 1997.

H. Krawczyk, "SKEME: A Versatile Secure Key Exchange Mechanism for Internet". IEEE Proceedings of the 1996 Symposium on Network and Distributed Systems Security.

P. Karn and W. Simpson, "Photuris: Session-Key Management Protocol", draft-simpson-photuris-17.txt, November 1997.

H. Harney and C. Muckenhim, "Group Key Management Protocol (GKMP) Specification +Architecture", RFC2093 & RFC2094, July 1997.

A. Aziz, T. Markson, and H. Prafullchandra, "SKIP Extensions for IP Multicast".

A. Ballardie, "Scalable Multicast Key Distribution", RFC1949, May 1996.

T. Hardjono, B. Cain, N. Doraswamy, "A Framework for Group Key Management for Multicast Security", draft-ietf-gkmframework-00.txt, July 98.

D. Harkins and N. Doraswamy, "A Secure Scalable Multicast Key Management Protocol," ETF, IETF Draft draft-ietf-ipsecond-00.txt, November 1997.

S. Mittra, "The Iolus Framework for Scalable Secure Multicasting," presented at Proceedings of ACM SIGCOMM97, 1997.

M. Handley and V. Jacobson, "SDP: Session Description Protocol", RFC 2327, April 1998.

A television system for controlling access to broadcast transmissions is described in U.S. Pat. Nos. 5,282,249 and 5,481,609, both to Cohen et al.

The disclosures of all references mentioned above and throughout the present specification are hereby incorporated herein by reference.

SUMMARY OF THE INVENTION

The present invention seeks to provide improved apparatus and methods for key distribution, suitable for use in a multicast communication system. While the apparatus and methods of the present invention are particularly suited to an Internet Protocol (IP) Multicast system, it is appreciated that the present invention would also be applicable to other types of Multicast systems, with appropriate modifications as will be appreciated by persons skilled in the art. Without limiting the generality of the foregoing, the example of IP Multicast will generally be used throughout the present specification, and the example of IP Multicast will be taken to include Multicast over an Intranet wherever applicable.

In securing IP Multicast traffic from one source to multiple recipients, it is desirable to implement security apparatus and methods to authenticate the source, to authenticate and to ensure integrity of the data, and possibly to encrypt and/or sign the data At first glance, it appears that these services can be provided using standard authentication, integrity, and encryption methods, based either on symmetric-key or asymmetric-key designs. One might look to known schemes, such as well-known pay television schemes, to provide such standard methods and apparatus.

A major problem in Secure Multicast systems involves distributing, in real time, the appropriate cryptographic keys from the multicast source to all the authorized recipients of the multicast. The keys used for authentication, integrity, and confidentiality may change frequently, either due to policies that determine that keys need to change, for example, every few seconds, or in response to changes in the membership of the multicast group. A multicast group membership change might comprise an existing member having just left or a new member having just joined the group.

Generally, the goal of multicast key distribution is to securely deliver common keys to all the authorized members of a multicast group. Having such keys allows a sender to authenticate and/or to encrypt the traffic destined for a multicast group. Thus, the group keys also afford membership-enforcement by allowing only key holders to verify and/or decrypt the multicast traffic. A sender must authenticate and/or encrypt all traffic that it sends to the group in order to maintain secure delivery.

In certain prior art systems, the key distribution function is assigned to a central network entity, sometimes known as the Key Distribution Center (KDC). However, this method does not scale well for wide-area multicasting, where group members may be distributed across many networks and a wide-area group may be densely populated. Even more complicated is the problem of distributing sender-specific keys in a scalable manner, sender-specific keys being required when data is to be authenticated on a per-sender basis. Pair-Wise key-management protocols and Key Distribution Centers do not provide scalable solutions for the multicast key-management problem.

Completely automatic protocols for multicast key distribution are currently not considered mature enough for use. For small multicast groups, manual. key distribution or multiple invocations of a unicast (point-to-point) key distribution protocol, such as authenticated Diffie-Hellman, appear adequate. However, for large multicast groups, new scalable techniques and protocols are needed.

In P Multicast systems, unlike in broadcast TV systems, the multicast traffic is typically routed from the sender to multiple recipients over the existing Internet infrastructure. This means that traffic may pass through intermediate nodes and that it can be listened in to in an unauthorized manner by interested parties. In addition, multicast traffic in the Internet is not synchronized in the way that broadcast over a satellite or over cables is synchronized. Due to the fact that data flows through routers, some packets may be lost, some packets may be delayed, and some packets may come out of order. Finally, the nature of the connectivity in Internet systems may make the use of different key-distribution methods than the ones used in TV broadcasting desirable.

Known multicast key-distribution methods include:

1. Star methods—where the multicast sender corresponds directly with each one of the clients, and keys are handed over securely over point-to-point connections.

2. Multicast methods—where keys are sent in multicast packets from the multicast sender to many recipients, and each key in the multicast packet is encrypted specifically for one client, typically using a personal key for that client.

3. Group methods—where there are logical or physical subgroups, and each sub-group has a Group Controller that receives the keys from the multicast sender and distributes them inside the group, typically using one of the methods mentioned here.

4, Tree methods—where each client is associated with a leaf in a logical tree, and each leaf contains the keys of all the nodes on the path from the root to it. This enables communicating securely with each client or with sub-groups of clients with a small number of keys involved. The number of keys is typically logarithmically related to the number of clients in the system.

Each of the above-mentioned methods is useful and has merits in a different range of parameters of multicast traffic. These parameters include:

1. The size of the multicast group.

2. The dynamics of the multicast group (few/many joins, few/many leaves).

3. The locality/remoteness of the multicast group members; this may include an absolute location of one or more group members, typically comprising a distance of one or more group members from the key distributor, or a relative location of one or more group members in terms of other group members.

4. The existence/nonexistence of client clusters in well defined logical or physical sub-domains.

5. The reason for key distribution (periodic mode vs. event-driven mode).

It is appreciated that other appropriate parameters may also be used.

More generally, the parameters mentioned above may also be considered to fall into the following groups:

a characteristic of the associated multicast group;
a location of at least one recipient comprised in the multicast group;
a characteristic of the key; and
a characteristic of the multicast traffic.

The present invention provides apparatus and methods to support multiple key-distribution methods in a multicast system and a methodology for selecting the method that is best suited for a given set of parameters and for switching between methods, including dynamically switching between methods, even at run time, based on a change in the parameters.

The apparatus at the sender side preferably comprises:

a generator of keys, or a repository of keys, the keys intended to be distributed to a multicast group,
multiple key-distribution sender-side methods, such as, for example, star, multicast, group, tree, as described above;
a selector that selects and activates a specific method to be used;
a decision-maker component that evaluates the multicast parameters at run-time; and
a controller that sends instructions, comprising either in-band instructions, out-of-band instructions, or any appropriate combination thereof, to client receptors regarding the method to use.

The apparatus at the client side preferably comprises:

multiple key-distribution client-side methods, corresponding to those mentioned above;
a selector that selects and activates the specific method to be used;
a control receiver that receives control instructions from the sender's controller regarding which method to use; and
a key interpretation component, or a repository of keys received.

At the sender side the set of multicast parameters is preferably evaluated at run time and a decision is reached as to which method is best under the circumstances.

Preferably, the decision may be based on decision tables and rules for ranges of the parameters. By way of example, some appropriate rules might look like:

1. For small groups, up to X members, use the star method.

2. For medium groups, having more than Y and less than Z members, switch to the multicast method.

3. For large groups, having more than Z members. use the group method or tree method.

4. If groups are logically or physically segmented and there are more than W members in a cluster, then pick a group controller for that cluster. If the rate of membership change is low, use the star method or multicast method. If the rate of membership change is high, use the group or tree methods.

In the above example, X, Y, Z, and W are parameters of the system for which specific appropriate values could be determined.

Preferably, there would be a large number of rules in practice.

Since there could be conflicts between rules, it could be determined that some rules are dominant over others. Alternatively, a weight could be given to each rule, and the result will be based on the conclusion that has gathered the most weight.

There is thus provided in accordance with a preferred embodiment of the present invention a key distribution method for distributing, via a communications network, a key in a multicast communication system in which each one of a plurality of communications is directed to an associated multicast group including a plurality of recipients intended to receive the one communication, the method including providing a plurality of implemented key distribution methods, dynamically choosing one implemented key distribution method of the plurality of key distribution methods, and distributing at least one key using the one implemented key distribution method.

Further in accordance with a preferred embodiment of the present invention the step of dynamically choosing includes choosing based, at least in part. on at least one of the following: a characteristic of the associated multicast group, a location of at least one recipient included in the multicast group, a characteristic of the key, a multicast traffic characteristic, a multicast content characteristic and a characteristic of the multicast group.

Still further in accordance with a preferred embodiment of the present invention the characteristic of the associated multicast group includes at least one of the following: a size of the multicast group, and a dynamic parameter associated with the multicast group.

Additionally in accordance with a preferred embodiment of the present invention the location includes at least one of the following: an absolute location, typically comprising a distance from the key distributor, a relative location; and an association between the at least one recipient and a sub-domain of the communications network.

Further in accordance with a preferred embodiment of the present invention the characteristic of the multicast traffic may include at least one of the following: streaming real-time feed; and non-real time transfer.

Moreover in accordance with a preferred embodiment of the present invention characteristic of the key includes a distribution characteristic.

Further in accordance with a preferred embodiment of the present invention the communications network includes the Internet.

Still further in accordance with a preferred embodiment of the present invention the communications network includes an Intranet.

Additionally in accordance with a preferred embodiment of the present invention the plurality of implemented key distribution methods includes at least one of the following: a star distribution method, a multicast distribution method, a group distribution method, and a tree distribution method.

There is also provided in accordance with another preferred embodiment of the present invention key distribution apparatus for distributing, via a communications network, a key in a multicast communication system in which each one of a plurality of communications is directed to an associated multicast group including a plurality of recipients intended to receive the one communication, the apparatus including a plurality of implemented key distribution methods, a decision maker and selector for dynamically choosing one implemented key distribution method from the plurality of implemented key distribution methods, and a multicast distribution unit for distributing at least one key using the one implemented key distribution method.

There is also provided in accordance with another preferred embodiment of the present invention key reception apparatus for receiving, via a communications network, a key in a multicast communication system in which each one of a plurality of communications is directed to an associated multicast group including a plurality of recipients intended to receive the one communication, the key being distributed using one implemented key distribution method chosen from a plurality of methods, and indication of the one implemented key distribution method being transmitted via the communications network, the apparatus including a plurality of implemented key distribution methods, a selector, responsive to the indication of the one implemented key distribution method, for dynamically choosing the one implemented key distribution method from the plurality of implemented key distribution methods, and utilization apparatus for utilizing the key in accordance with the one implemented key distribution method.

dr

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
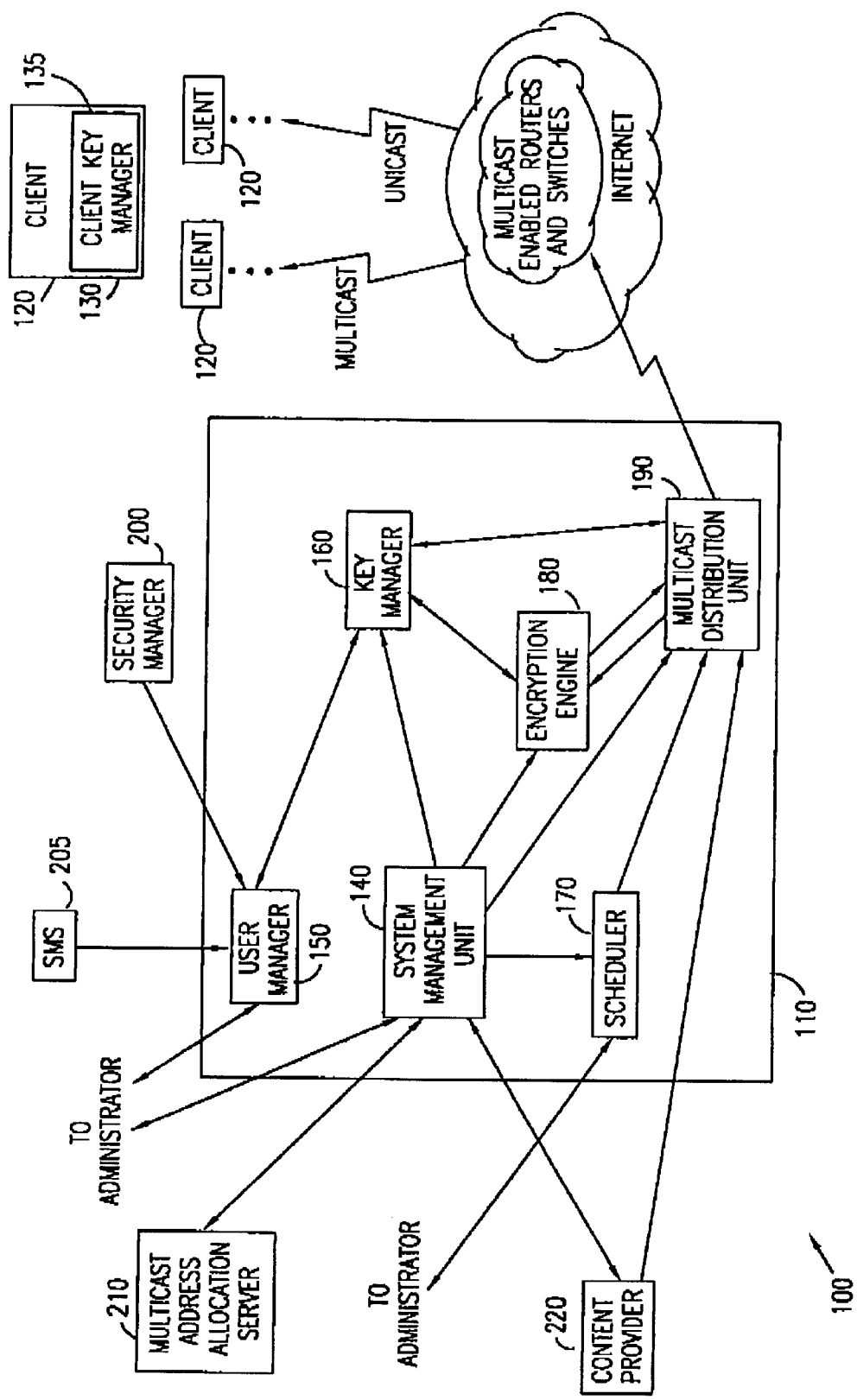
FIG. 1 is a simplified block diagram illustration of a multicast communication system constructed and operative in accordance with a preferred embodiment of the present invention.

Reference is now made to FIG. 1 which is a simplified block diagram illustration of a multicast communication system constructed and operative in accordance with a preferred embodiment of the present invention. The system of FIG. 1 comprises a multicast communication system 100, which is designed to allow secure multicast communication, Generally, in the multicast communication system 100 of FIG. 1, multicast communications are authenticated and/or encrypted and validation and/or decryption keys necessary to read the multicast communication arc distributed in a secure way by a central server. One possible method for key distribution involves changing keys every few seconds, as is well-known in the art of pay television. It is well known in pay television systems to encrypt each key using a key known to all receivers or only to authorized receivers. It is also known in pay television systems to send a seed to a one-way function used for generating the decryption key at the receiver end. It is appreciated that similar techniques may be used, separately or in combination, in the present invention.

The multicast communication system 100 preferably comprises a central site 110, also termed herein a server site 110. The multicast communication system also preferably comprises a plurality of client sites 120, some or preferably all of which comprise key-capable client sites such as a key-capable client site 130.

Only one server site 110 is shown in FIG. 1 for purposes of simplicity of description, but it is appreciated that a plurality of server sites, possibly but not necessarily in operative communication with each other, may also be used. Only three client sites 120 are shown in FIG. 1. for purposes of simplicity of description, but it is appreciated that a large number of client sites 120, including a large multiplicity such as millions of client sites 120, may preferably be used. It is also appreciated that components and functions shown as being comprised in the server site 110 may alternatively be distributed in different locations.

Each key-capable client site 130 preferably comprises a client key manager 135 operative to process received keys. A preferred implementation of the client key manager 135 is described in more detail below with reference to FIG. 2.

The server site 110 preferably comprises the following components, each of which may be implemented in a combination of hardware and software, as is well-known in the art:

1. A system management unit 140, operative to control and direct distribution of secure multicast items by the server site 110. The system management unit 140 is preferably operative to manage: individual items, also termed herein articles; predefined collections of items, also termed herein packages; security attributes; and user groups. The term article, as used herein, may also be understood as referring to a part of a multicast transmission, transmitted on a specific channel and having well-defined starting and ending points. Generally, an article is the minimum part of the transmission that can be consumed by a consumer as a content unit; if a consumer or customer has authorization to view an article the consumer or customer has authorization to view the entire article. Typically, an article is the basic unit used for scheduling a multicast in the present invention.

The system management unit 140 also is preferably operative to enable configuration setup, such as setup of IP address of servers and control of multicast channels. The system management unit 140 may also be operative to perform one or more of the following tasks:

Extend configuration data

Provide an interface to a Multicast Address Allocation Server (MAAS) 210 as is well-known in the art, preferably acquiring multicast addresses for the logical multicast channels from the MAAS 210.

Provide an interface to one or more content providers, such as a content provider 220.

Analyze the taxonomy of a planned multicast session and adjust the system to the session characteristics. The system management unit 140 may take into consideration the parameters of the multicast groups.

Set key distribution policy and send the policy to a key manager 160, described below.

Support different security policies, allowing the system administrator to control the granularity at which a security service is offered. The system management unit 140 preferably incorporates facilities for specifying which security services to use in what combinations, and the security methods. It may take into consideration parameters of the multicast groups. The system management unit 140 preferably allows specification of who may grant access to content objects.

Manage multicast content items.

Enable packaging of multicast content items to product items for sale, the package thus produced typically comprising a plurality of content items packaged for sale.

Provide an interface for a system administrator (not shown), typically a person well versed in operation of the multicast communications system 100, to manage the multicast communication system 100 and to configure operation policies.

Manage the multicast transportation in the infrastructure that is under the scope of the system:

Enable/disable multicast transportation to different network segments

Manage multicast aspects at multicast routers

Manage scope zones

2. A user manager 150, operative to store information about each registered user of the multicast communication system 100 in an appropriate database (not shown), as is well known in the art, and to authorize users for access to each multicast item based on user information such as, for example, a stored user profile, an authentication ID, or a key. It is appreciated that users may be aggregated by the user manager 150 according to common interest, enterprise hierarchy, or any other appropriate criterion. Furthermore, the user manager 150 may store any appropriate user information such as, for example, user preferences and one or more spending limits associated with a user The user manager 150 may also be operative to perform one or more of the following tasks:

Manage users profiles. User attributes comprised in user profiles are preferably accessible only to the system administrator mentioned above.

Manage user authentication and user admissions to the multicast communication system 100, typically receiving from a user a request to login to the multicast communication system 100, authenticating the user by validating the user's identity using any appropriate validation method and creating a shared secret key with the user for the session, Methods of creating a shared secret key for a session are well known in the art, and any appropriate method may be used.

Support user registration for an item and manage access to the item, typically by receiving a user request for accessing a specific multicast item, validating the authorizations of the user to access the item, requesting and receiving a key from a key manager 160, described below, for the item and finally sending the key or keys to the user.

Support user revocation, typically by receiving a request to terminate a multicast transportation of a specific stream for a specific user from either a user/client application or the system management unit 140 or the system administrator and handling the request appropriately, such as by sending a key revocation request to a key manager 160, described below.

Support termination of client session, typically by receiving a logoff request from a user/client and handling the request appropriately, such as by sending a key revocation requests to a key manager 160 described below, if appropriate, completing a measurement of time or data volume that was consumed by the user during the session, or by carrying out any other appropriate action.

Support online package purchase.

Manage and monitor the active users of the multicast communication system 100, typically including monitoring user behaviors, preferably in an attempt to identify one or more suspicious user behaviors. Suspicious user behaviors might include one or more of the following: a high rate of login/logout attempts, particularly unsuccessful attempts; login/logout attempts, particularly unsuccessful attempts, on different terminals within a short period of time; or other suspicious behaviors, as are well known in the art. When identifying suspicious activity the user manager 150 preferably reacts as follows, including one or more of the following actions:

Terminate a current session in progress.

Block new session attempts that match a criterion, such as a criterion related to an identified suspicious activity, over a specified time period, such as a predefined time period.

Notify users of any unsuccessful login attempts that may have been made since their last login.

Block one or more suspicious user accounts.

Report to the system administrator on the above activities and on actions taken.

Enable tracking of user activities, such as for purposes of auditing and/or accounting, by maintaining one or more user activity logs.

Enhance access options to user profiles by carrying out one or more of the following:

Support updates of some of the user attributes by the user.

Support retrieve of some of the user attributes by content providers.

3. A key manager 160, operative to manage keys within the multicast communication system 100. Some of the interactions of the key manager 160 have been described above with reference to other elements of the system of FIG. 1.

The key manager 160 preferably handles, controls and directs the issuing, deploying and storage of encryption keys. The key manager 160 preferably receives a key distribution policy from the system management unit 140. The key distribution policy preferably specifies the frequency of key distribution and sets procedures by which the key manager can grant, deploy and revoke keys.

The key manager 160 may also be operative to perform one or more of the following tasks:

Receive requests for keys and generate the keys.

Create key encryption keys (KEKs). As described above, the multicast communication system 100 is preferably operative to change keys frequently during the multicast of an item, such as, for example, once every several seconds, using a method similar to methods which are well known in the pay television field. Typically, each new key is encrypted with a key encryption key (KEK); managing distribution of the KEK such that only authorized users receive each KEK is an important function of the present invention.

Distribute the KEKs to the authorized registered users, typically using one of the key distribution methods previously described in a case where a multicast distribution method is chosen.

Pass the KEK to a multicast distribution unit 190, described below,

Receive requests, typically from the user manager 150, for key revocation for a specific client/content combination, determine the method for key revocation and revoke the keys.

Determine the appropriate key distribution method.

A preferred implementation of the key manager 160 is described in more detail below with reference to FIG. 2.

4. A scheduler 170, preferably operative to manage a schedule of articles or items to be multicast by the multicast communication system 100. The scheduler 170 preferably receives requests for article transmission times from the system management unit 140, assembles a transmission schedule based, at least in part, on the received requests, and allows an operator to modify and store the transmission schedule, which is ultimately acted upon by a multicast distribution unit 190, described below. The scheduler 170 is also preferably operative to perform one or more of the following tasks:

Automatic/manual scheduling of articles across logical channels and time tables; that is, an article is typically assigned to a specific logical channel or set of logical channels at a specific time.

Support scheduling rules.

Support scope zone and multicast address allocation.

5. An encryption engine 180, preferably operative to receive as input multicast content and/or multicast control information, typically received from a multicast distribution unit 190, described below. The encryption engine 180 also typically receives one or more keys from the key manager 160. The encryption engine 180 is preferably operative to encrypt and/or sign the multicast content and/or multicast control information according to an appropriate encryption method. The encryption method used preferably enables encoding and or signing of the content and/or control information using a cryptographic key, as is well known in the art.

The encryption engine 180 is also preferably operative to perform one or more of the following tasks:

Set and get encryption key; typically, the multicast distribution unit 190 gets a key from the key manager 160 and sets the key to the encryption engine 110 for encryption and/or signing.

Receive plain unencrypted data, including multicast content or multicast control information, and apply an encryption method to the data, producing encrypted data as output.

Set and get configuration data, typically getting configuration data from the system management unit 140 and setting the data to the encryption engine 180.

Support data signing, preferably using any appropriate method, such as a method well-known in the art.

6. A multicast distribution unit 190, typically operative to perform one or more of the following tasks:

Receive content from an appropriate source, preferably comprising the external content provider 220, according to a specified schedule, typically specified by the scheduler 170. The content provider 220 may comprise any appropriate content provider, as is well-known in the art, and may alternatively be comprised within the server site 110.

Encrypt and/or authenticate received content, preferably in conjunction with the encryption engine 180 and by using the encryption engine 180 as described above, with content protection keys, preferably received from the key manager 160.

Encrypt and/or authenticate the content protection keys, preferably in conjunction with the encryption engine 180 and by using the encryption engine 180 as described above, with KEKs received from the key manager 160.

Multicast the encrypted data multiplexed with the encrypted content keys, using any appropriate multiplexing method such as an appropriate method well-known in the art.

Convey SDP messages to clients in a proactive fashion, that is, the SDP messages are not explicitly requested by the clients. SDP messages, as is well known in the art, are messages that conform to the format specified in the Session Description Protocol 2327 RFC, as described in M. Handley and V. Jacobson, "SDP: Session Description Protocol", RFC 2327, April 1998.

Assign multicast addresses for multicast channels in the planned schedule.

The server site 110 is preferably in operative communication with the following related external components, some or all of which may alternatively be comprised in the server site 110:

a security manager 200, which preferably generates and maintains user authentication data and which may, for example, comprise a password server or a certificate server, and a subscriber management system (SMS) 205, which preferably handles maintenance, billing, control and general supervision of subscribers to conditional access technology multicast services, typically comprising either an automatic system where subscribers order entitlement by entering information online, typically via a PC or a telephone, and/or a manual system in which subscribers speak with an operator who manually enters their entitlement requests.

The operation of the system of FIG. 1 is now briefly further described. The system management unit 140 is preferably responsible for content management. The system management unit 140 preferably enables an administrator of the system of FIG. 1 to define articles and packages and to manage them.

The user manager 150 preferably enables the administrator to define users and to manage their profile and authorizations. The scheduler 170 preferably enables the administrator to create a schedule for multicasting articles. The multicast distribution unit 190 preferably multicasts articles according to a schedule plan. In case an article needs to be encrypted, it being appreciated that one or more articles may not necessarily need to be encrypted, the article is preferably encrypted by the encryption engine 180, preferably using content keys which are generated by the key manager 160.

The key manager 160 also preferably encrypts the content keys using KEKs. The multicast content, preferably comprising a plurality of articles, is multiplexed with multicast control information preferably including for example, encrypted content keys. The multiplexed multicast content is preferably distributed by the multicast distribution unit 190 via a multicast delivery infrastructure, typically comprising multicast enabled routers and switches within the Internet, as is well known in the art.

A client 120, typically comprising a key-enabled client 130, preferably begins use of the system of FIG. 1 by registering for a client session. The registration process includes authentication of the client 130 and the server site 110. The client then typically orders an article and upon a successful validation of the client's authorization by the user manager 150, the client typically receives one or more KEKs, which are used for decrypting the multicast content keys, typically either from the user manager 150 or within a multicast stream that is distributed by the multicast distribution unit 190 during the session. The content is received by the client where it is decrypted, typically including processing by the client key manager 135, and used by the appropriate applications.

Figure 2:
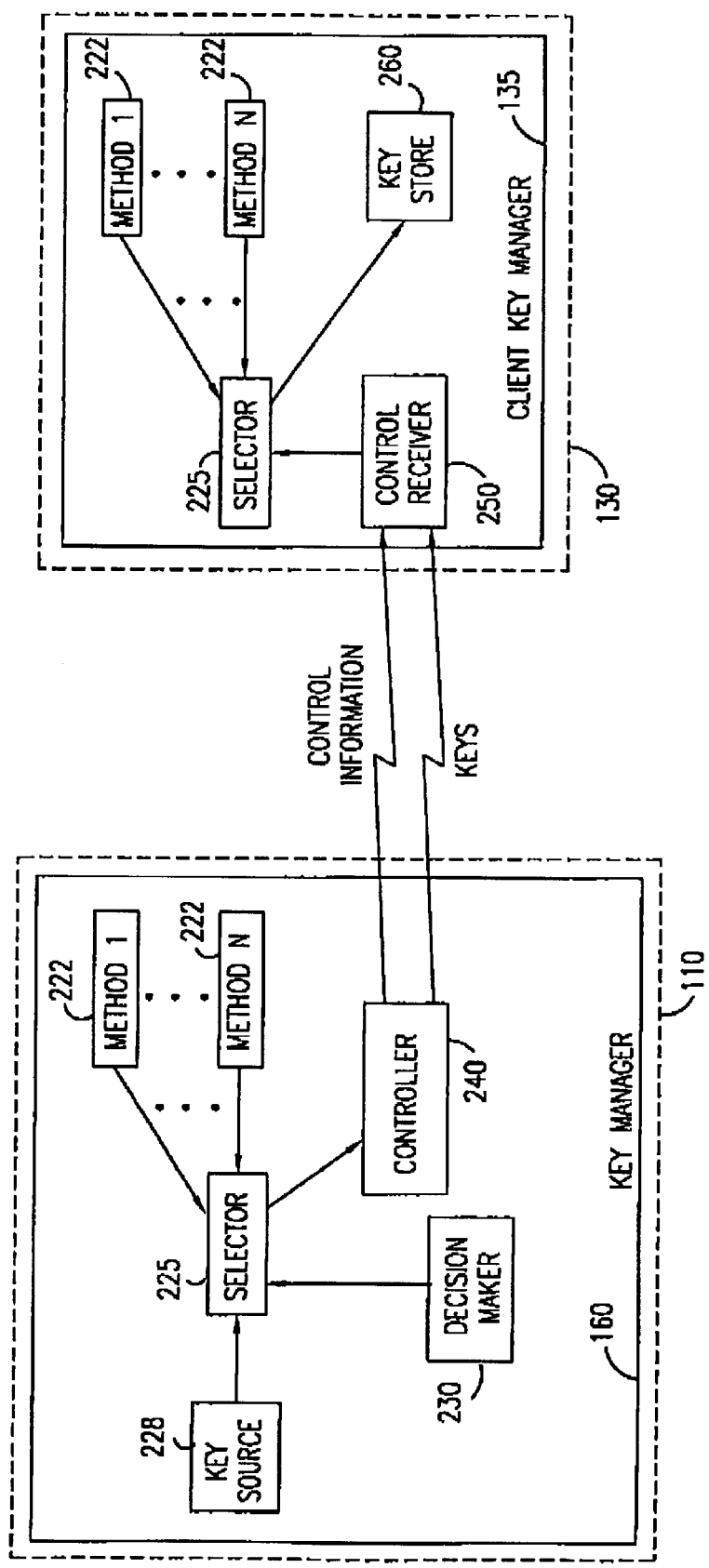
FIG. 2 is a simplified block diagram illustration of a preferred implementation of a portion of the system of FIG. 1.

Reference is now made to FIG. 2, which is a simplified block diagram illustration of a preferred implementation of a portion of the system of FIG. 1. The portion of the system of FIG. 1 shown in FIG. 2 includes the key manager 160 of the server site 110 and a client key manager 135 of a client 130 of FIG. 1. Other elements of FIG. 1 are omitted from FIG. 2 for purposes of simplicity of description. The apparatus of FIG. 2 is designed to implement an improved method of multicast key distribution.

The apparatus of FIG. 2 includes the following components, each of which may be implemented in any appropriate combination of hardware and software, except as otherwise described below:

Preferably comprised in the key manager 160, a plurality of implemented distribution methods 222, each implemented distribution method 222 being implemented in any appropriate combination of hardware and software such as, for example: stored in an appropriate fashion, such as stored in the form of a computer program; implemented in special purpose hardware; or implemented in any other appropriate manner. Each implemented distribution method 222 typically comprises a key distribution method, either a method well-known in the art or any other appropriate method. Without limiting the generality of the foregoing, the following methods, known in the art, comprise some examples of appropriate implemented distribution methods 222:

Star methods—where the multicast sender corresponds directly with each one of the clients, and keys are handed over securely over point-to-point connections.

Multicast methods—where keys are sent in multicast packets from the multicast sender to many recipients, and each key in the multicast packet is encrypted specifically for one client, typically using a personal key for that client.

Group methods—where there are logical and/or physical sub-groups, and each sub-group has a Group Controller that receives the keys from the source and distributes them inside the group, typically using one of the methods mentioned here.

Tree methods—where each client is associated with a leaf in a logical tree, and each leaf contains the keys of all the nodes on the path from the root to it. This enables communicating securely with each client or with sub-groups of clients with small number of keys involved, the number of keys being typically logarithmically related to the number of clients in the system.

Preferably comprised in the key manager 160, a selector 225, a key source 228, a decision maker 230, and a controller 240. The selector 225 is typically responsible, under control of the decision maker 230, to select a method for distribution of a key received from the key source 228. The decision maker 230 preferably decides on a key distribution method from among the plurality of implemented distribution methods 222 in accordance with appropriate criteria. For example, the decision may be based on decision tables and rules for ranges of the parameters. By way of example, some appropriate rules might include rules like the following:

1. For small groups, up to X members, use the star method.

2. For medium groups, having more than Y and less than Z members, switch to the multicast method.

3. For large groups, having more than Z members, use the group method or tree method.

4. If groups are physically segmented and there are more than W members in a cluster, then pick a group controller for that cluster. If the rate of membership change is low, use the star method or multicast method. If the rate of membership change is high, use the group or tree methods.

Preferably, there would be a large number of rules in practice.

Since there could be conflicts between rules, it could be determined that some rules are dominant over others. Alternatively, a weight could be given to each rule, and the result will be based on the conclusion that has gathered the most weight.

The controller 240 is preferably operative to transmit the keys and associated control information.

The following example provides one particularly detailed example of how relevant factors might be taken into account by the decision maker 230:

| PROTOCOL | FACTOR NUMBER OF MEMBERS IN THE MULTICAST GROUP | RATE OF KEY DISTRIBUTION |
|---|---|---|
| Star | Few - Very Good (*)<br>Small - good<br>Medium - Fair<br>Large - NR ()<br>Very large - NR () | Low - Good<br>Medium - Very good<br>High - Very good |
| Multicast | Few - Very good<br>Small - Very good<br>Medium - Good<br>Large - Weak<br>Very large - NR (**) | Low - Very Good<br>Medium - Good<br>High - Fair |
| Group | Few - NR (**)<br>Small - Weak<br>Medium - Good<br>Large - Very good<br>Very large - good | Low - Very Good<br>Medium - Good<br>High - Fair |
| Tree | Few - NR (**)<br>Small - Weak<br>Medium - Very Good<br>Large - Good<br>Very large - Weak | Low - Very Good<br>Medium - Good<br>High - Fair |

The following symbols are used in the above example:
(*) Dominant factor for selecting this algorithm type
(**) Dominant factor for not selecting this algorithm type
NR = Not Recommended The following are sample values for the attributes in the above example.

Grades

Very good=4
Good=3
Fair=2
Weak 1
Not Recommended=0

Number of Members

Few :Size<50
Small :50<=Size<500
Medium :500<=Size<5000
Large :5000<=Size<50000
Very large :Size>=50000

Rate of Key Distribution

X=first threshold of key exchange per time
Y=second threshold key exchange per time
Low: Rate<X
Medium: X<=Rate<Y
High: Y<=Rate It is believed that actual values for X and Y would need to be determined for each particular system configuration.

It is appreciated that the above example is one possible example only, that many other examples are possible, and that the above example is not intended to be limiting.

The decision maker 230 preferably acts dynamically; that is, a new method from the plurality of methods 222 may be chosen at any appropriate time, due to a change in any factor on which the decision maker 230 bases a decision.

Preferably comprised in the key manager 160 is a controller 240. The controller 240 is preferably operative to receive information from the selector 225, preferably comprising a key and sufficient information to allow the controller 240 to carry out distribution of the key in accordance with the method selected by the selector 225 from among the plurality of methods 222. The controller 240 preferably transmits control information, the control information preferably including one or more keys and information identifying a distribution method being used. It is appreciated that particular details of key distribution in each case will preferably be based on the distribution method being used, as is well-known in the art.

The control information is typically received at a client key manager 135. While the client key manager 135 is shown as being comprised in a key-enabled client 130, it is appreciated that the client key manager 135 may also be comprised, for example, in a server in an Intranet, the Intranet comprising one or more clients 120 and/or key-enabled clients 130; in a regional server (not shown); in a corporate server (not shown); or in any other appropriate client or appropriate server, as is well-known in the art.

The client key manager 135 preferably comprises a control receiver 250. which is preferably operative to receive the control information sent by the controller 240. In response to the information identifying the distribution method being used, the controller 240 is preferably operative to direct a selector 225 to select an appropriate key distribution method from a plurality of implemented distribution methods 222. The key is then processed appropriately such as, for example, by being utilized within the client key manager 135, including by being stored in a key store 160, or by being supplied to another component of the system of FIG. 1, or otherwise processed as appropriate.

Figure 3:
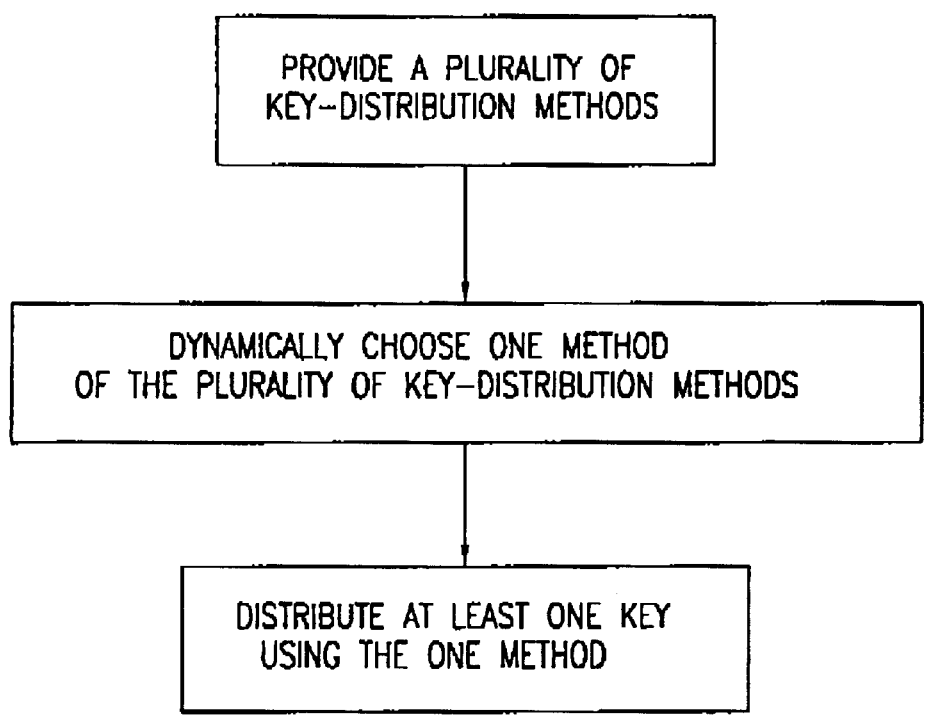
FIG. 3 is a simplified flowchart illustration of a preferred method of operation of the apparatus of FIG. 2.

Reference is now made to FIG. 3, which is a simplified flowchart illustration of a preferred method of operation of the apparatus of FIG. 2. The method of FIG. 3 is self-explanatory with reference to the above discussion.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A key distribution method for distributing, via a communications network, a key in a multicast communications system in which each one of a plurality of communications is directed to an associated multicast group comprising a plurality of recipients intended to receive the one communication, the method comprising:

providing a plurality of implemented key distribution methods;

dynamically choosing one implemented key distribution method of the plurality of key distribution methods; and distributing at least one key using the one implemented key distribution method.

2. A method according to claim 1 and wherein the step of dynamically choosing comprises choosing based, at least in part, on at least one of the following:

a characteristic of the associated multicast group;
a location of at least one recipient comprised in the multicast group;

a characteristic of the key;

a multicast traffic characteristic; and a multicast content characteristic.

3. A method according to claim 2 and wherein the characteristic of the associated multicast group comprises at least one of the following:

a size of the multicast group; and a dynamic parameter associated with the multicast group.

4. A method according to claim 2 and wherein the location comprises at least one of the following:

an absolute location;

a relative location; and an association between the at least one recipient and a sub-domain of the communications network.

5. A method according to claim 3 and wherein the location comprises at least one of the following:

an absolute location;

a relative location; and an association between the at least one recipient and a sub-domain of the communications network.

6. A method according to claim 2 and wherein the characteristic of the key comprises a distribution characteristic.

7. A method according to claim 3 and wherein the characteristic of the key comprises a distribution characteristic.

8. A method according to claim 1 and wherein the communications network comprises the Internet.

9. A method according to claim 2 and wherein the communications network comprises the Internet.

10. A method according to claim 1 and wherein the communications network comprises an Intranet.

11. A method according to claim 2 and wherein the communications network comprises an Intranet.

12. A method according to claim 1 and wherein the plurality of implemented key distribution methods comprises at least one of the following:

a star distribution method;

a multicast distribution method;

a group distribution method; and a tree distribution method.

13. A method according to claim 2 and wherein the plurality of implemented key distribution methods comprises at least one of the following:

a star distribution method;

a multicast distribution method;

a group distribution method; and a tree distribution method.

14. Key distribution apparatus for distributing, via a communications network, a key in a multicast communications system in which each one of a plurality of communications is directed to an associated multicast group comprising a plurality of recipients intended to receive the one communication the apparatus comprising:

a plurality of implemented key distribution methods;

a decision maker and selector for dynamically choosing one implemented key distribution method from the plurality of implemented key distribution methods, and a multicast distribution unit for distributing at least one key using the one implemented key-distribution method.

15. Apparatus according to claim 14 and wherein the plurality of implemented key distribution methods comprises at least one of the following:

a star distribution method;

a multicast distribution method;

a group distribution method; and a tree distribution method.

16. Apparatus according to claim 14 and wherein said dynamically choosing comprises choosing based, at least in part, on at least one of the following:

a characteristic of the associated multicast group;

a location of at least one recipient comprised in the multicast group;

a characteristic of the key;

a multi cast traffic characteristic; and a multicast content characteristic.

17. Key reception apparatus for receiving, via a communications network, a key in a multicast communications system in which each one of a plurality of communications is directed to an associated multicast group comprising a plurality of recipients intended to receive the one communication, the key being distributed using one implemented key distribution method chosen from a plurality of methods, and indication of the one implemented key distribution method being transmitted via the communications network, the apparatus comprising:

a plurality of implemented key distribution methods;

a selector, responsive to the indication of the one implemented key distribution method, for dynamically choosing the one implemented key distribution method from the plurality of implemented key distribution methods; and utilization apparatus for utilizing the key in accordance with the one implemented key distribution method.

18. Apparatus according to claim 17 and wherein the plurality of implemented key distribution methods comprises at least one of the following:

a star distribution method;

a multicast distribution method;

a group distribution method; and a tree distribution method.

19. Apparatus according to claim 17 and wherein said dynamically choosing comprises choosing based, at least in part, on at least one of the following:

a characteristic of the associated multicast group;

a location of at least one recipient comprised in the multicast group;

a characteristic of the key;

a multicast traffic characteristic; and a multicast content characteristic.

* * * * *